United States Patent [19]

Correia

[11] Patent Number: 4,470,265
[45] Date of Patent: Sep. 11, 1984

[54] REFRIGERANT CHARGING SYSTEM
[75] Inventor: Joseph T. Correia, Lyman, S.C.
[73] Assignee: Gerlach Industries, Spartanburg, S.C.
[21] Appl. No.: 376,293
[22] Filed: May 10, 1982
[51] Int. Cl.³ ............................................. F25B 45/00
[52] U.S. Cl. .......................................... 62/77; 62/149; 62/292
[58] Field of Search .................. 62/77, 292, 149, 513, 62/84, 174; 137/305; 177/60; 222/77

[56] References Cited
U.S. PATENT DOCUMENTS
4,261,178  4/1981  Cain ........................................ 62/149

Primary Examiner—Albert J. Makay
Assistant Examiner—Henry Bennett
Attorney, Agent, or Firm—Julian W. Dority

[57] ABSTRACT

An apparatus for charging a refrigeration system with a predetermined amount of refrigerant by weight. The apparatus includes a cylinder which is mounted on top of a strain gauge scale that is first filled from a source of refrigrant and then automatically discharged to fill a refrigeration system with a predetermined amount of refrigerant. The system includes solenoid operated valves which are automatically operated for loading the cylinder and charging the refrigeration system. A vacuum pump is also included in the circuit for placing the refrigeration system under a predetermined vacuum prior to the charging operation.

8 Claims, 4 Drawing Figures

REFRIGERANT CHARGING SYSTEM

BACKGROUND OF THE INVENTION

Heretofore, when charging refrigeration systems with refrigerant, normally the amount of refrigerant that is fed into the system is measured by flow meters. One problem with using flow meters is that temperatures and various atmospheric conditions affect the refrigerant, and as a result it is difficult to load the refrigeration system with consistent and accurate amounts of refrigerant.

Attempts have been made to preload cylinders carried on top of scales so that a predetermined weight of refrigerant can be loaded from the cylinder into the refrigeration systems. Normally, these systems utilize spring operated scales which are not highly accurate when they are being used to weigh a predetermined amount of refrigerant as is flowing from the cylinder so as to cut off the flow of refrigerant when a predetermined weight has been charged into the refrigeration system.

Examples of various types of refrigerant charging and weighing devices are disclosed in U.S. Pat. Nos. 2,746,258; 3,076,319 and 3,400,552.

SUMMARY OF THE INVENTION

In order to overcome the above mentioned problem, applicant devised a system for automatically charging a refrigeration system with a predetermined weight of refrigerant from a supply of refrigerant. The system includes a first conduit which extends between the supply of refrigerant and the refrigeration system. A cylinder is carried on top of a strain guage scale and has a piston provided therein. A conduit extends from the top of the cylinder to the first conduit which is connected to the supply of refrigerant and the refrigeration system. A pressurized source of air is connected to the lower portion of the cylinder. The refrigerant is loaded into the upper portion of the cylinder depressing a piston until it strikes a limit switch closing a solenoid valve carried in the first conduit between the cylinder and the source of refrigerant. Simultaneously with the loading of the refrigerant into the cylinder, a vacuum pump is used for placing the refrigeration system under a vacuum. Upon a vacuum of a predetermined level being reached, a vacuum sensor closes a solenoid valve extending between the vacuum pump and the refrigeration system and opens another solenoid valve interposed in the first conduit between the refrigeration system and the cylinder. The pressurized source of air forces the piston upwardly and, in turn, forces the refrigerant out of the upper portion of the cylinder into the refrigeration system.

Prior to beginning of the loading of the refrigerant into the refrigeration system, a strain guage scale, upon which a cylinder is resting, is reset so as to produce a signal when a predetermined amount by weight of the refrigerant is forced out of the cylinder by the air coming into the bottom of the cylinder. Upon reaching this predetermined amount of weight, the scale generates a signal causing the solenoid valve, interposed between the cylinder and the refrigeration system, to be closed so as to ready another charging cycle for another refrigeration system.

Accordingly, it is an important object of the present invention to provide a system for charging a refrigeration system with a predetermined weight of refrigerant.

Another important object of the present invention is to provide a system for loading an accurate amount by weight of refrigerant into a refrigeration system regardless of the environmental conditions surrounding the system.

Still another important object of the present invention is to provide a simple, accurate and relatively inexpensive system for charging a refrigeration system with a refrigerant.

A most important object is the configuration of the cylinder to increase the low factory air pressure to high refrigerant pressure. This assures the refrigerant is in liquid form throughout the system and no compensation is needed for temperature or density change.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

Description of a Preferred Embodiment

Figure 1:
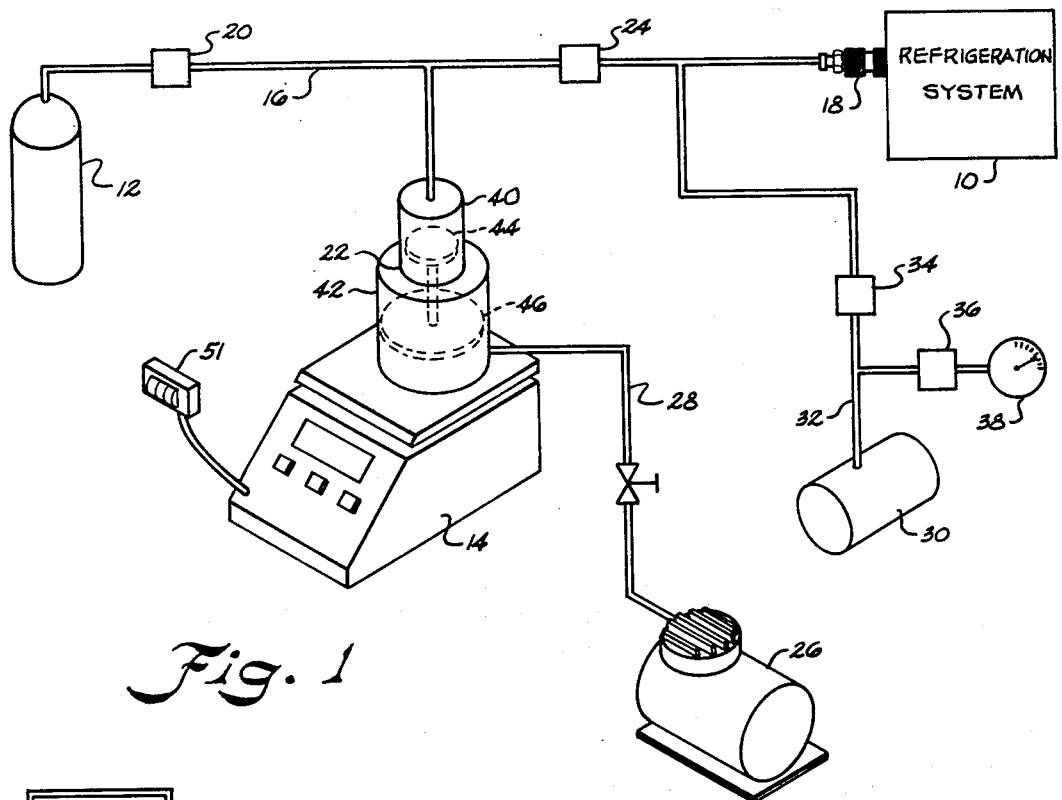
FIG. 1 is a perspective view partially in schematic form illustrating a system constructed in accordance with the present invention.

Referring in more detail to FIG. 1 of the drawings, there is illustrated in semi-block form a system for automatically charging a refrigeration system 10 with a refrigerant supplied from a pressurized source 12. In order that a predetermined weight of refrigerant be charged in each refrigeration system 10 that is connected to the system, the refrigerant is weighed on a strain gauge scale 14, such as manufactured by Pennsylvania Scale Co. of Leola, Pa. having Model No. EWO 4010, as it is charged into the refrigeration system. A first conduit line 16 extends between the source of refrigerant and the refrigeration system and is coupled thereto by a quick disconnect coupling 18. The quick disconnect coupling automatically closes the line associated therewith upon being removed from the refrigeration system. A first solenoid valve 20 is interposed in the first conduit 16 between the pressurized source and the top of a cylinder 22. A second solenoid valve 24 is interposed in the first conduit line between the cylinder 22 and the refrigeration system.

By manipulating the solenoid valves 20 and 24, the refrigerant from the source 12 can be first loaded into the cylinder 22 and then a predetermined amount by weight is forced back out of the cylinder 22 through the solenoid valve 24 for charging the refrigeration system. The scale 14 is electrically connected to the solenoid valve 24 for closing the solenoid 24 upon a predetermined weight of refrigerant being forced out of the cylinder 22.

The refrigerant is forced out of the cylinder 22 by compressed air produced by a compressor 26 which is connected by means of a conduit 28 to a lower portion of the cylinder 22.

Prior to loading the refrigeration system with the refrigerant, it first must be placed under a vacuum, and such is accomplished by means of a vacuum pump 30 which is connected by a second conduit 32 to the quick connect coupling 18. Another solenoid valve 34 is connected in the second conduit 32 for connecting and disconnecting the vacuum pump from the coupling 18 and the refrigeration system 10. A vacuum sensor 36 provided with a guage 38 is used for activating the solenoid valve 34 to close the conduit 32 upon the refrigeration system reaching a predetermined vacuum. The vacuum sensor 36 also generates a signal which is used for operating the second solenoid valve 24. The details of operation will be discussed more fully below.

The cylinder 22 includes an upper portion 40 which has a smaller diameter than a lower portion 42. Two heads 44 and 46 of a piston are carried within the upper portion 40 and the lower portion 42, respectively, and are joined together by means of a rod 49. Since the piston head 46 is much larger than the piston head 44, less pressure per square inch is required for raising the pistons to force the refrigerant out of the upper portion of the upper cylinder 40. This permits normal air pressure that is available in a plant to be utilized for forcing the refrigerant out of the upper cylinder 40 for charging the refrigeration system 10. Since a strain guage scale 14 is being utilized for weighing the cylinder and the refrigerant therein rather than a spring scale, as the refrigerant is removed from the cylinder 40 when charging the refrigeration system 10, an accurate weight measurement can be made of the refrigerant being forced out of the upper cylinder 40.

Figure 2:
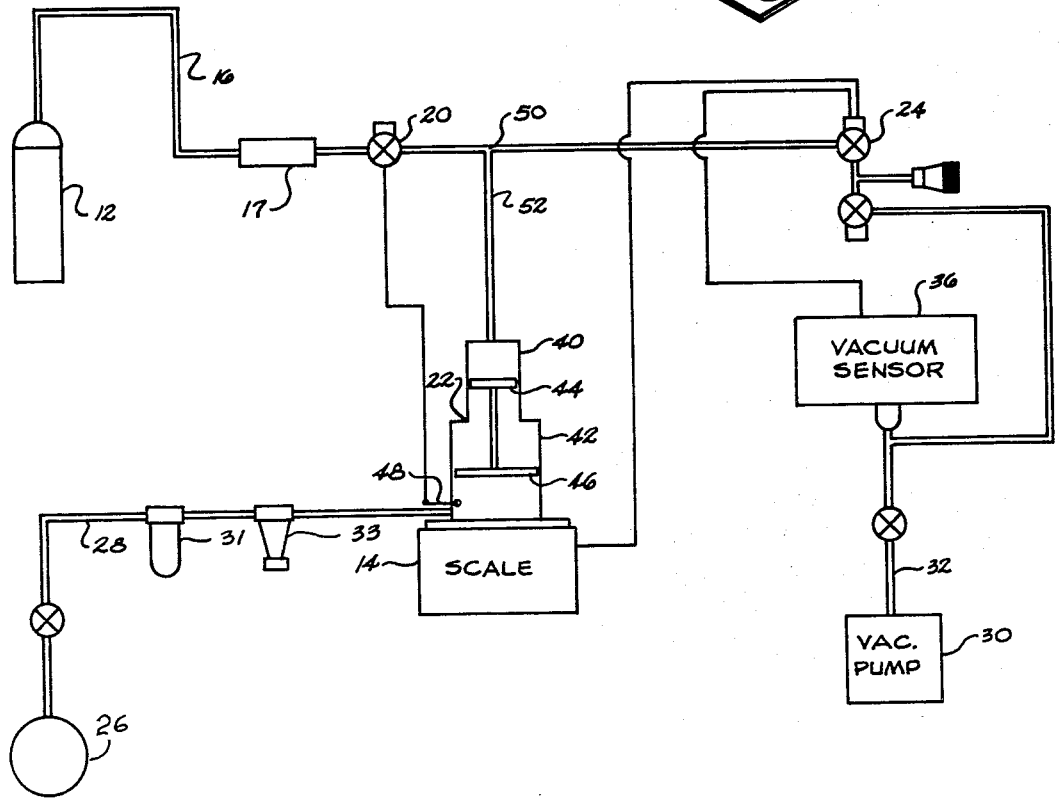
FIG. 2 is a fluid flow chart for the system including lines representing electrical flow paths.

Referring now to FIG. 2 of the drawings, there is illustrated a flow diagram with partial electrical controls associated therewith. As can be seen, the refrigerant is fed from a pressurized tank 12 through a first conduit 16, a filter 17, a first solenoid valve 20, to a T-joint 50. It then flows down through a tube 52 in the top portion of cylinder 40 for depressing the piston 44 downwardly to the cylinder.

The piston 44 is depressed until the lower half of the piston 46 strikes a limit switch 48 provided in the bottom of the cylinder 42.

The limit switch 48 generates a signal for resetting the strain gauge scale 14 to zero (00). When the strain gauge scale reaches the minus preset weight upon removal of the refrigerant from the cylinder 22 it will generate a signal for activating solenoid valve 24 for stopping the loading of the refrigeration system. The desired amount of weight of refrigerant to be charged is preset on dial 51.

The compressor 26 is connected through tube 28, oil filter 31, a regulator 33 to the bottom of the cylinder 42.

The other side of the "T" junction 50 is connected to the solenoid valve 24 which, in turn, is connected to the quick disconnect coupling 18.

The vacuum pump 30 is connected through a second conduit 32 to a third solenoid valve 34. The vacuum sensor 36 is also connected to the second conduit 32 for determining when the refrigeration system has reached a predetermined vacuum and generating a signal for closing the third solenoid valve 34 and opening the second solenoid valve 24 for initiating the charging of the refrigeration system.

Figure 4:
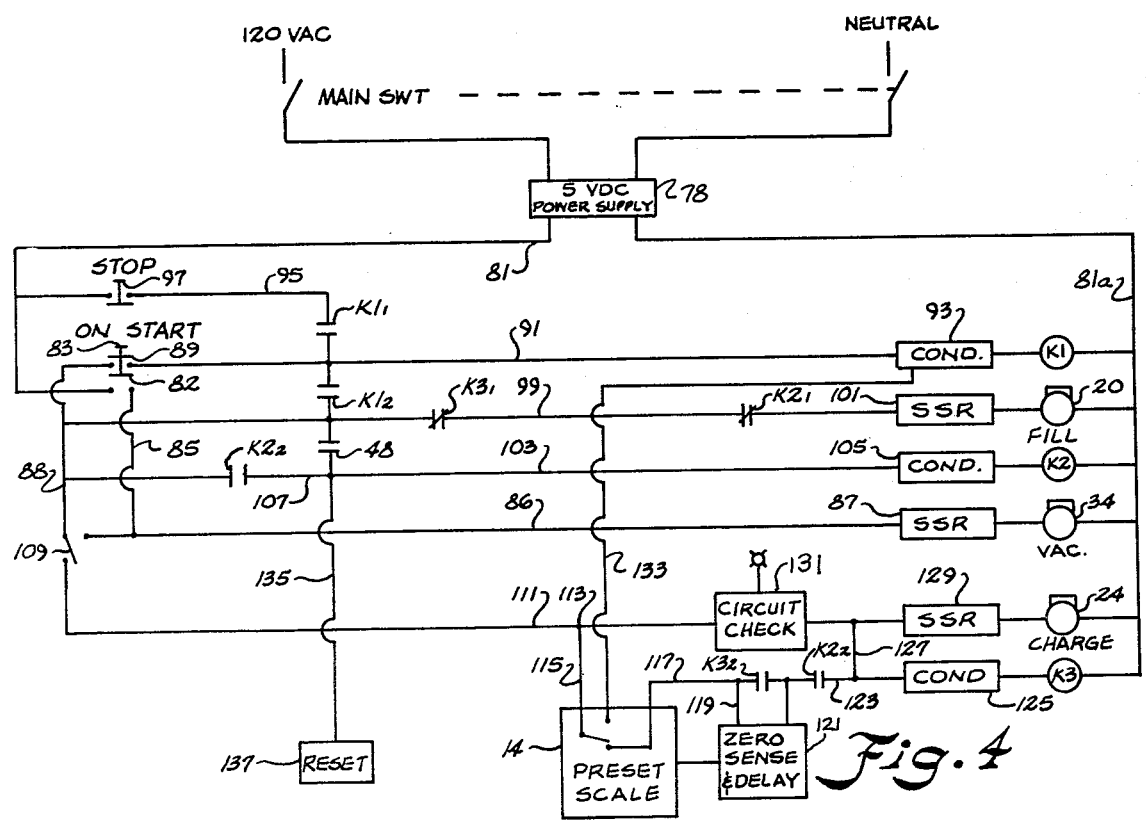
FIG. 4 is an enlarged elevational view partially in section showing a modified form of a cylinder that can be utilized with said invention.

Referring to FIG. 4 of the drawings, there is illustrated a modified form of the cylinder that can be utilized in the system. The cylinder includes a single piston 138 which has a head provided with a pair of spaced O-rings 140 and 142, respectively. Interposed between the O-rings 140 and 142 is a cylindrical groove 144 which communicates with the interior of an open top cylindrical member 145 by means of a bore 146. The purpose of this is to prevent the mixing of the air which is supplied through opening 150 into the bottom of the cylinder 152 with the refrigerant that enters through the port 154 into an upper portion 156 of the cylinder. If the refrigerant or air happens to get beyond these seals 140 and 142, they would flow into the groove 144 to the bore 146 into the open top cylinder 145 preventing mixing within the main cylinder.

It is also noted that O-rings are provided adjacent the upper portion of the main cylinder 152 bearing against the surface of the cylinder 145, as indicated by the reference character 160. The operation of the cylinder 152, shown in FIG. 4, is the same as that of the cylinder 22 shown in FIG. 1 with the exception that a single head piston is used rather than a double head piston.

Figure 3:
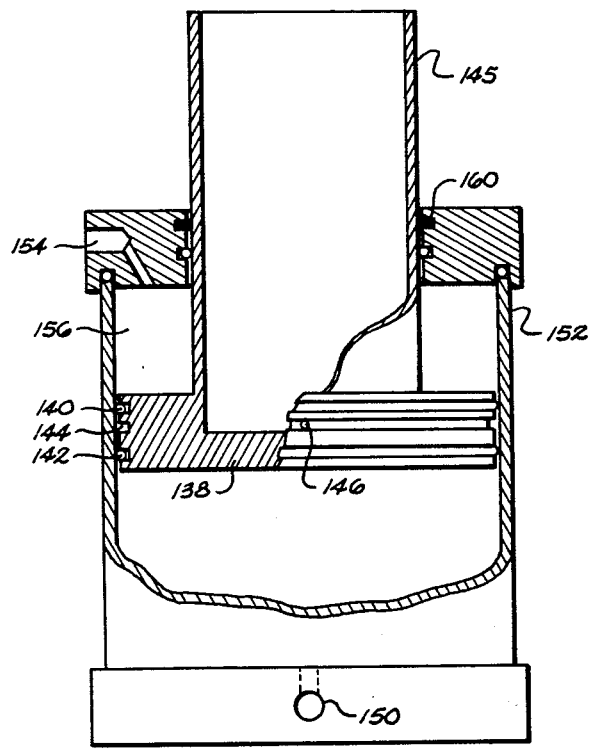
FIG. 3 is a schematic diagram of the electrical system.

Referring to FIG. 3 of the drawing, there is illustrated a schematic electrical diagram for controlling the operation of the refrigerant filling system. A 120 volt A.C. power supply is connected to a 5 volt D.C. power supply 78 which converts the 120 volts. A.C. to 5 volts. D.C. The 5 volts D.C. power supply is fed between leads 81 and 81a. The current flows down through lead 81 to a bottom contact 82 of a double contact start switch 83 which was depressed to initiate the operation. The current flows down line 85 to lead 86 through a solid state relay 87 that steps up the voltage from 5 volts back to 120 volts for energizing the vacuum solenoid 34. The vacuum solenoid when energized sees a higher pressure than what it is statically shut off at so that the vacuum gauge switch 109 switches and now goes back to making contact between lead line 88 and lead line 86. The vacuum pump runs continually, that is why vacuum gauge reads so low and contacts 109 of gauge have to change. The current then flowing down lead 85, flows back up through lead 88 through the upper contact 89 over lead 91 to a voltage conditioner 93 which steps up the 5 volts to 120 volts energizing relay K1. When relay K1 is energized, it closes contacts $K1_1$ in lead 95 extending through the stop button 97 which is normally closed, making a circuit between lead line 81 and the K1 relay providing an interlock around the start button. It also provides a current path through relay contact $K1_2$, normally closed contact $K3_1$, lead 99, normally closed contact $K2_1$ through the solid state relay 101 energizing the fill solenoid 20. The solid state relay 101 steps up the voltage to the fill solenoid from 5 volts to 120 volts. Upon energization of the fill solenoid 20, the freon flows into the top of the cylinder 22 until the piston 46 is depressed sufficiently to close fill switch 48. Upon closing fill switch 48, there is a current path through lead 103 to the voltage conditioner 105 energizing relay K2. When relay K2 is energized, it opens contact $K2_1$ in the fill solenoid circuit 99, de-energizing the fill solenoid 20. There is also a circuit provided through lead 107 now closed contacts $K2_2$, back up through lead 88 providing an interlock for relay K2. Now that the filling of the cylinder 22 has been taken care of and the vacuum within the refrigeration system is reduced to a predetermined level, the vacuum switch 109 moves to the left closing the circuit in lead 88. This also causes the vacuum solenoid 34 to be de-energized. When the vacuum switch 109 is moved to the left, current flows down through lead 111 to a junction 113. Extending down from junction 113 is a lead 115 that is connected to a preset circuit associated with the scale. As long as the scale reads less than what is preset for, current flows through lead 117, down through lead 119 into a zero sense and delay circuit 121, back up through normally, open, now closed, contact K2$_2$, lead 123, energizing relay K3 after it passes through a voltage conditioner 125.

At the same time that relay K3 is energized, current also flows up through lead 127, through the solid state relay 129 to energize the charge solenoid valve 24. When the charge solenoid valve 24 is energized, the air pressure in the bottom of the cylinder forces refrigerant up through the charge solenoid into the refrigeration system for charging the refrigeration system until preset weight value is reached on scale.

When the vacuum gauge 109 was shifted to the left, it also completed a circuit to a check circuit 131, energizing a light associated therewith indicating to the operator that up to this point everything is operating properly. The check circuit 131 only illuminates the help light until the current flows through lead 127 on the other side of the check circuit extinguishes the lamp.

Now that the charged solenoid valve 24 has been energized, the refrigerant is pumped into the refrigerant system until the scale indicates that a predetermined amount of refrigerant by weight has been pumped out of the cylinder 42. At this point a switch associated with the preset scale closes, sending current up lead 133 to the voltage conditioner 93 associated with the relay K1 cutting off the voltage to relay K1, de-energizing the entire circuit.

Going back to the full switch 48, when it is closed a circuit is made through lead 135 to a reset circuit 137 causing a pulse to be generated by the reset circuit that resets the scale 14 to zero.

While a preferred embodiment of the invention has been described using specific terms, such description is for illustrative purposes only, and it is to be understood that changes and variations may be made without departing from the spirit or scope of the following claims.

What is claimed is:

1. A system for charging a refrigeration system with a predetermined weight of refrigerant from a supply of refrigerant comprising:
   a first conduit extending between said supply of refrigerant and said refrigeration system;
   a strain gauge scale;
   a cylinder carried on said strain gauge scale;
   a piston carried in said cylinder isolating an upper portion of said cylinder from a lower portion;
   means for diverting the flow of refrigerant from said first conduit into said upper portion of said cylinder depressing said piston a predetermined distance;
   means for disconnecting said supply of refrigerant from said first conduit;
   a pressurized source of air connected to said lower portion of said cylinder forcing said refrigerant out said top portion of said cylinder into said refrigeration system;
   means operably connected to said scale for disconnecting said refrigeration system from said first conduit upon a predetermined weight of refrigerant being transferred from said cylinder to said refrigeration system.

2. The system as set forth in claim 1 further comprising:
   a vacuum pump;
   a second conduit extending between said vacuum pump and said refrigeration system for placing said refrigeration system under a vacuum;
   means for selectively connecting said vacuum pump to said refrigeration system for placing said refrigeration system under a vacuum prior to being located with said refrigerant.

3. The system as set forth in claim 2 further comprising:
   means for sensing when said vacuum reaches a predetermined level cutting off said vacuum pump and connecting said refrigeration system to said first conduit for receiving said refrigerant from said cylinder.

4. The system as set forth in claim 1 further comprising:
   said upper portion of said cylinder into which said refrigerant is fed having a first diameter;
   said lower portion of said cylinder into which said pressurized air is fed having a larger diameter than said upper portion of said cylinder;
   said piston including two spaced heads, one head being in said upper portion of said cylinder and said other head being in said lower cylinder; and
   a rod extending between said two heads.

5. The system for charging a refrigeration system as set forth in claim 1 further comprising:
   said means for disconnecting said supply of refrigerant from said first conduit including a first solenoid valve;
   said means operably connected to said scale for disconnecting said refrigeration system from said first conduit including a second solenoid valve.

6. The system for charging a refrigeration system as set forth in claim 5 further comprising:
   said means for selectively connecting said vacuum pump to said refrigeration system including a third solenoid valve.

7. The system for charging a refrigeration system as set forth in claim 1 further comprising:
   limit switch means carried in said cylinder for closing said first solenoid valve upon said refrigerant flowing into an upper portion of said cylinder forcing said piston down to said cylinder a predetermined distance.

8. A method of charging a refrigeration system with a predetermined weight of refrigerant from a supply of refrigerant comprising:
   loading an upper portion of a cylinder which is carried on a strain gauge operated scale with said refrigerant depressing a piston carried therein to a predetermined position; said piston being depressed during loading of said upper portion of said cylinder until said piston activates a switch upon reaching said predetermined position which automatically stops the loading of said refrigerant into said upper portion of said cylinder and resets said strain gauge scale to zero;
   placing said refrigeration system under a vacuum;
   connecting said upper portion of said cylinder to said refrigeration system after said refrigeration system is placed under a vacuum;
   applying pressurized air to a lower portion of said cylinder forcing said piston upward in said cylinder and said refrigerant out said cylinder into said refrigeration system until a predetermined weight of refrigerant as measured by said strain gauge operated scale is loaded into said refrigeration system; and automatically stopping the flow of refrigerant into said refrigeration system when said strain gauge generates a signal indicating said predetermined weight of refrigerant has been loaded into said refrigeration system.

* * * * *